United States Patent [19]

Leclercq et al.

[11] Patent Number: 4,828,792

[45] Date of Patent: May 9, 1989

[54] NUCLEAR FUEL ASSEMBLY WITH HOLDING STRUCTURE AND HOLD DOWN DEVICE

[75] Inventors: Joseph Leclercq, ST Didier au Mt d'OR; Jean-Noël Canat, Lyons, both of France

[73] Assignee: Fragema, Courbevoie, France

[21] Appl. No.: 895,101

[22] Filed: Aug. 11, 1986

[30] Foreign Application Priority Data

Aug. 9, 1985 [FR] France ................. 85 12240

[51] Int. Cl.$^4$ ............................................. G21C 3/32
[52] U.S. Cl. ..................... 376/364; 376/445
[58] Field of Search ............... 376/178, 285, 362, 364, 376/445, 446, 449, 353

[56] References Cited

U.S. PATENT DOCUMENTS

| | | | |
|---|---|---|---|
| 3,600,276 | 8/1971 | Nims, Jr. ................. | 376/445 |
| 3,814,667 | 6/1974 | Klumb et al. ............. | 376/364 |
| 3,971,575 | 7/1976 | Lesham et al. ........... | 376/364 |
| 4,078,967 | 3/1978 | Anthony ................. | 376/364 |
| 4,278,501 | 7/1981 | Steink ................... | 376/364 |
| 4,522,782 | 6/1985 | LeClerq ................. | 376/449 |
| 4,534,933 | 8/1985 | Gjertsen et al. .......... | 376/364 |
| 4,572,816 | 2/1986 | Gjertsen et al. .......... | 376/364 |
| 4,655,995 | 4/1987 | Freeman et al. .......... | 376/445 |
| 4,663,118 | 5/1987 | Nelson ................... | 376/445 |

FOREIGN PATENT DOCUMENTS 2240502 3/1975 France .

Primary Examiner—Deborah L. Kyle
Assistant Examiner—Richard L. Klein
Attorney, Agent, or Firm—Pollock, Vande Sande & Priddy

[57] ABSTRACT

A nuclear fuel assembly comprises a bundle of elongated fuel rods distributed at nodes of a regular lattice and a structure for retaining said fuel rods. The structure has a lower end piece, and upper end pieces, tie rods connecting said end pieces and grids distributed along the tie rods for maintaining the fuel rods at the nodes. The structure consists of two substructures slidable with respect to each other in the direction of the fuel rods. Springs located between the two substructures spread apart the two end pieces for respective abutment against a lower core plate and an upper core plate.

8 Claims, 4 Drawing Sheets

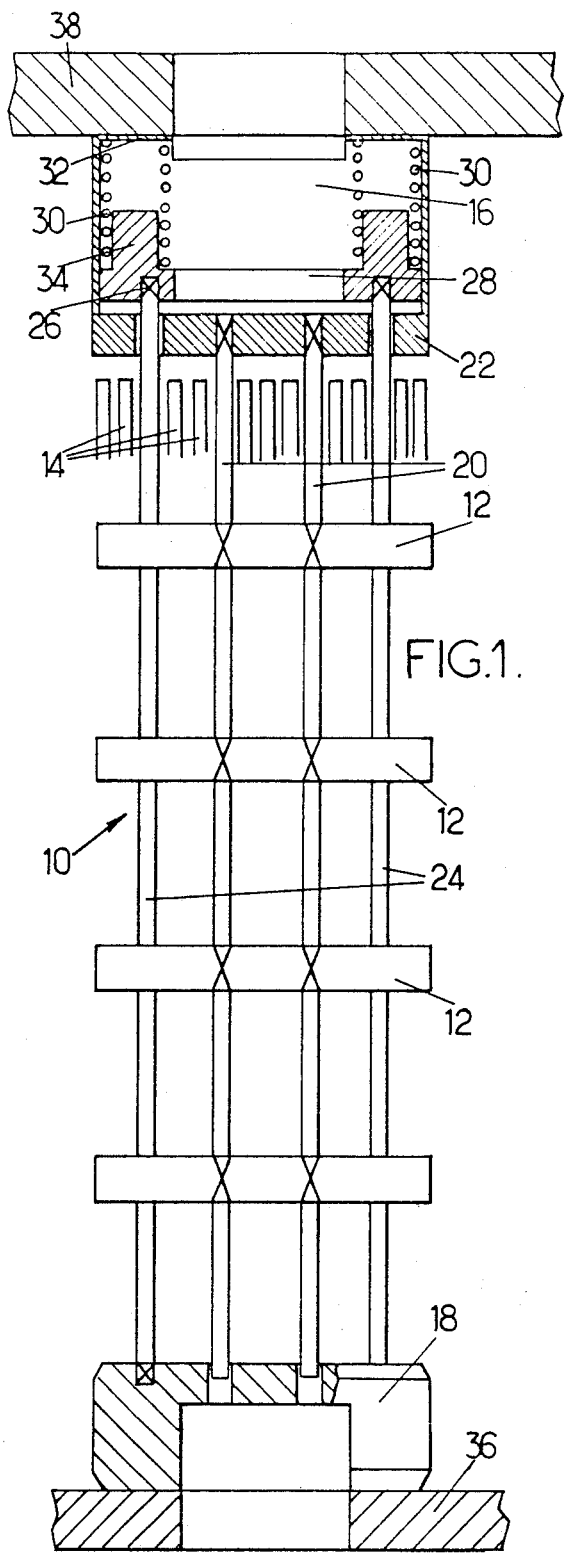
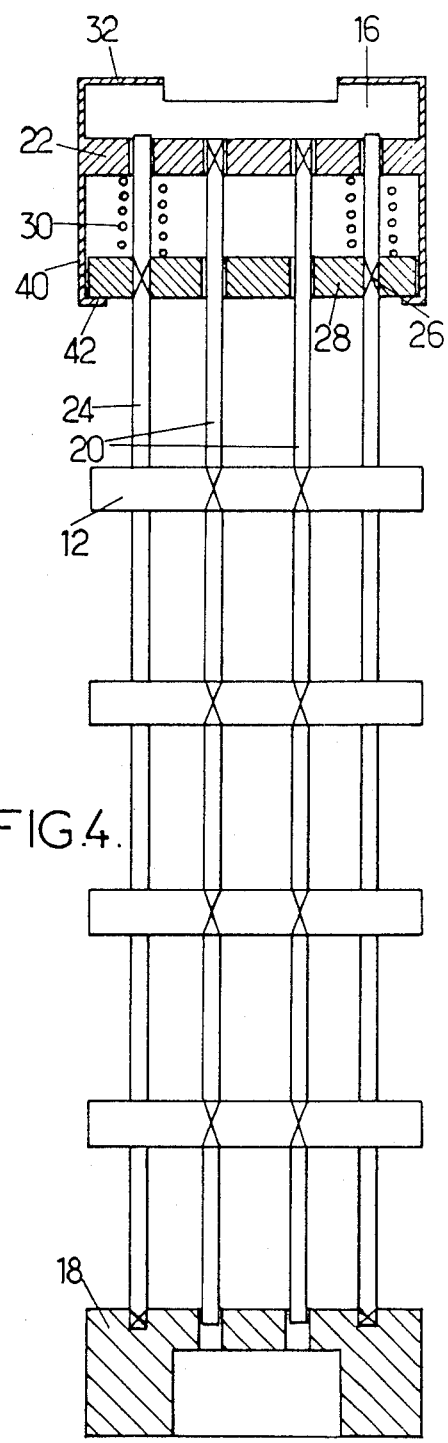
FIG.1.
FIG.4.

NUCLEAR FUEL ASSEMBLY WITH HOLDING STRUCTURE AND HOLD DOWN DEVICE

BACKGROUND OF THE INVENTION

1. Field of the Invention

The invention relates to fuel assemblies for nuclear reactors and it is particularly suitable for use in light water cooled and moderated reactors.

2. Description of the Prior Art

Most presently used nuclear fuel assemblies include a bundle of fuel rods (this term designating not only rods loaded with fissile material but also rods loaded with a fertile material) and a structure for holding the bundle, comprising upper and lower end pieces or nozzle connected together by tie rods (frequently serving as guide tubes for control rods) which carry grids for holding the fuel rods at the nodes of a regular lattice, and resilient means for transmitting forces to the upper end piece, forcibly applying the fuel assembly on a core support plate and having a hold down function.

A nuclear reactor core typically consists of such assemblies, of hexagonal or square cross-section, carried by a core support plate. The elements of the structure are fixed rigidly to each other. The end pieces have passages for the coolant and the core support plate has openings for coolant flow into the assemblies. The support plate has centering studs for engagement in the lower end piece for indexing it.

An upper core plate over the assemblies defines the core and has openings for discharging the coolant after it has been heated in the core. This upper plate constitutes, with elements for guiding control rod clusters, upper internal equipments of the reactor.

Due to the hydraulic thrust of the pressurized coolant on the fuel assemblies under normal operation and/or under transitory operating conditions, the assemblies must be provided with hold down devices for retaining them in contact with the core support plate. Such devices generally use resilient means. The most widely used approach consists in using springs fixed to the upper end piece of the assembly, on which the upper core plate bears so as to exert a force applying the assembly on the core support plate against the hydraulic thrust of the coolant. These springs may take on very different shapes, for example those described in French Nos. 1 536 257, 2 326 010, 2 412 142 and 2 409 576 to which reference may be made.

These spring devices operate substantially satisfactorily. They nevertheless raise problems. They are complex to manufacture. Their efficiency decreases progressively during irradiation. The space required for them decreases the coolant flow area in the upper end piece and increases the head loss. The springs hinder the introduction, into the upper end piece, of the tool for handling the assembly. The problems, or at least some of them, increase in seriousness on assemblies of great length. A major problem is created by the growth differential under irradiation and at high temperature, between the different constituents of the core and the assemblies, due to different materials being used (as zirconium base alloy and stainless steel). In present assemblies, having a length of several meters, the difference in length between adjacent assemblies, one of which is new and another has undergone irradiation, may be as high as several centimeters. The differences in length make it difficult to provide springs capable of permanently applying under all circumstances the assemblies against the core support plate, while this is necessary to avoid shocks and excessive vibrations of the rods. In addition, the steady increase in the power of nuclear reactors results in an increase of the hydraulic forces on the springs, which forces may become greater than the weight of the assembly, and require the use of larger and larger springs more and more difficult to integrate into the upper end piece.

SUMMARY OF THE INVENTION

It is an object of the invention to provide a nuclear fuel assembly of the above defined type, in which the hydraulic thrust on each assembly is taken under better conditions than in the past, particularly in that the forces to be transmitted by the resilient means are reduced.

For that, the invention uses the results of an analysis of the distribution of the hydraulic thrust applied to the assembly. This analysis shows that the thrust is mostly exerted on the rod bundle, the guide tubes and the holding grids. The thrust in these elements represents 80 to 85% of the hydraulic forces applied to the springs of a conventional assembly, the rest of the forces being exerted substantially equally on the end pieces.

With the above object in mind there is provided a fuel assembly of the above defined type in which the structure for holding the fuel elements comprises two separate substructures, which may slide vertically with respect to each other, one of which is arranged so as to be applied against the upper core plate by the hydraulic thrust in operation and the other of which is then held applied against the lower core plate by the resilient means. The resilient means may consequently be springs of smaller size as compared to resilient means of a conventional PWR fuel assembly. In practice, the structure in abutment against the lower core plate may be provided so as to receive only about 10% of the total hydraulic thrust, which allows to reduce the number and/or size of the hold down springs forming the resilient means substantially.

According to another aspect of the invention, there is provided an assembly of the above defined type, in which the structure includes two substructures movable vertically with respect to each other, one of the substructures including the upper end piece arranged to come into direct abutment against a fixed member, such as the upper core plate, and some of said tie rods, whereas the other substructure includes the lower end piece and a structure member axially movable with respect to the upper end piece, said resilient means being placed so as to exert on the movable member and the upper end piece a force tending to spread apart the end pieces of the assembly.

The first substructure may comprise, in addition to the upper end piece and some of the tie rods, a unit consisting of the fuel rod supporting grids and the rods. The second substructure will then be formed of the other tie rods and the lower end piece, secured together permanently.

With this arrangement, the resilient means will only have to exert the force required for holding down the second substructure in contact with the core support plate.

Direct abutment of the upper end piece with the upper core plate has an additional advantage: it is much more favorable than a resilient abutment in that it does not amplify vibrations in the top part of the assembly.

With the other substructure held in direct abutment against the core support plate by the resilient means, the risk of vibration in the lower part of the assembly will also be attenuated.

BRIEF DESCRIPTION OF THE DRAWINGS

The invention will be better understood from the following description of different embodiments, given by way of examples only. The description refers to the accompanying drawings in which:

FIG. 1 is a general diagram in elevation showing the structure of a fuel assembly according to a first embodiment of the invention;

FIGS. 4, 5 and 6, similar to FIG. 1, show modified embodiments of the invention;

DESCRIPTION OF PREFERRED EMBODIMENTS

Figure 2A:
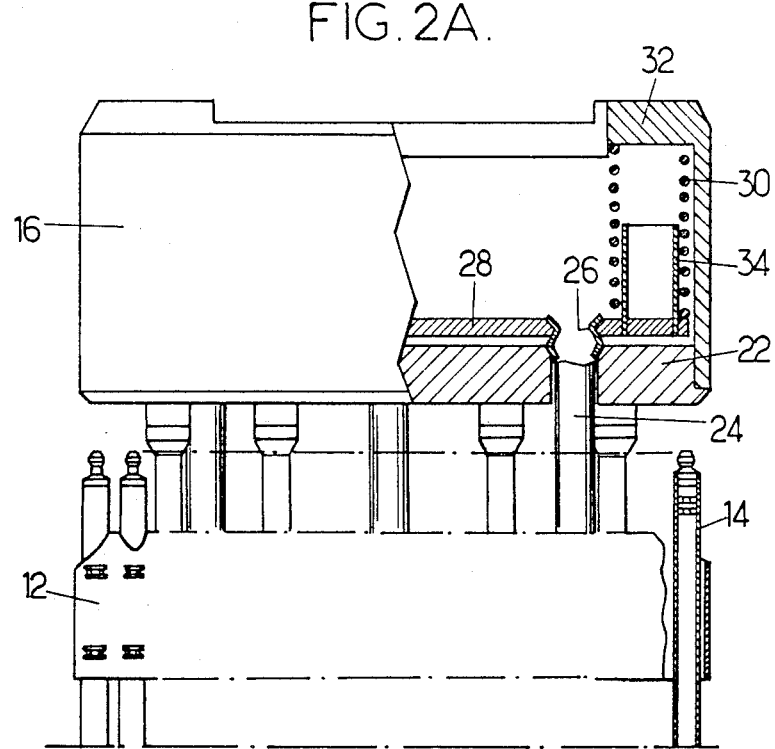
FIG. 2A and 2B are elevational views showing the top and bottom parts of an assembly having a structure of the kind shown in FIG. 1.

Referring to FIG. 1, a fuel assembly 10 has a support structure having grids 12 which retain fuel rods 14 according to a square lattice, two upper 15 and lower 18 end pieces and guide tubes holding the other components of the support structure in position. The top part only of the fuel rods is illustrated. The top part only of the fuel rods is illustrated.

The guide tubes, forming tie rods, are distributed between two groups. The guide tubes 20 of the first group are fixed permanently to grids 12, as shown schematically by a cross (X) in the figure. The guide tubes of the first group are also connected permanently to a plate 22 formed with outlet openings for the coolant, forming the bottom of the upper end piece 16. The permanent connections may be of any appropriate type and selected depending on the nature of the material forming the pieces to be assembled together. Welding, threaded connections or connections by deformation of a thin wall may be used as is well known in the art.

The guide tubes 20 of the first group are received in the lower end piece 18 in which they may slide vertically. The guide tubes 24 of the second group are rigidly fixed to the lower end piece 18. They project through cells in grid 12 in which they are slidably received. The guide tubes 24 pass through the bottom wall 22 of the upper end piece 16 and project inside piece 16. Their upper end is fixed by a permanent connection 26 to a perforated plate 28 mounted in a frame belonging to the upper end piece 16, above the bottom wall 22.

As shown in FIG. 1, four springs 30 are located between the plate 28 and flanges 32 at the upper part of the frame of the upper end piece 16. The springs are under a precompression so as to exert on plate 28 a force biasing it into contact with the bottom wall 22. Plate 28 advantageously includes studs 34 for holding the springs 30 in position and, possibly, for limiting their amount of compression by abutting flanges 32.

A first substructure, formed of the first group of guide tubes 20, grids 12 and the upper end piece 16, carries the fuel rods: it is subjected to about 90% of the hydraulic thrust received by the fuel assembly. A second substructure, comprising the lower end piece 18 and the guide tubes 24, receives about 10% of the hydraulic thrust. Consequently, springs 30 may be dimensioned so as to take up only 10% of the total thrust of the coolant on the fuel assembly.

When the assemblies are loaded into the reactor, the lower end piece of each assembly rests on the core support plate 36. Springs 30 bias the upper end piece 16 upwardly with a force which is less than the weight of the first substructure and the rods which it carries; the first substructure consequently remains in abutment on the second substructure. The upper core plate 38 may then be positioned. The whole of the weight of the assembly will be applied to the core support plate, directly for the second substructure, through the second substructure in so far as the first is concerned.

During start up and operation of the reactor, an upwardly directed thrust is exerted by the coolant. That force lifts the first substructure until the upper end piece 16 is in contact with the upper core plate. Then about 90% of the thrust will be directly applied to plate 38 by direct abutting connection rather than via resilient means. Due to the direct contact and the omission of the springs found in the prior art assemblies and which have their own resonance frequency, amplification of the vibration of the upper internal equipments (which the resilient means of conventional assemblies may generate on the fuel rod bundle 14) is avoided. Attenuation of the vibration of the fuel rods is an essential factor in improving the life of the sheath of the fuel rods and the life and efficiency of the springs provided in the grids for exerting on the fuel rods a force holding them in position.

The fraction of the thrust of the coolant which is exerted on the second substructure tends to raise the lower end piece 18 and to lift it off from the core support plate 36. Since however the fraction of the total thrust which is exerted on the second substructure is small, springs 30 having a low precompression, typically between 100 and 200 decanewton, are sufficient for holding the lower end piece 18 in contact with the core support plate 36. That direct contact again attenuates the vibrations of the fuel rod bundle.

Figure 3:
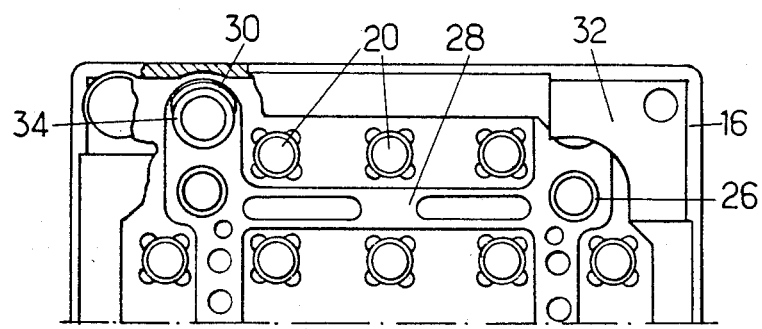
FIG. 3 is a top view of FIG. 2A, showing a fraction of the upper end piece and its connections with the guide tubes of the structure.
Figure 2B:
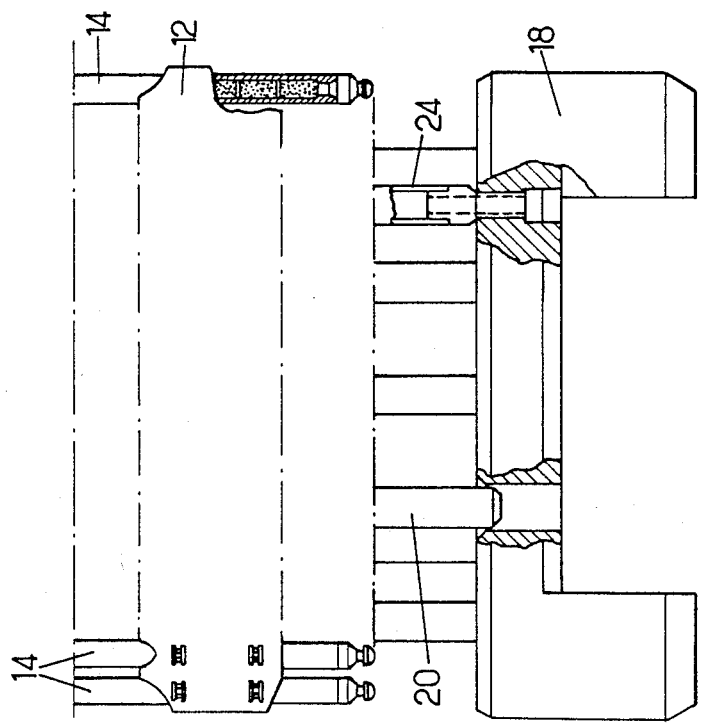

Referring to FIGS. 2A, 2B and 3, the connection of the guide tubes 20 and 24 with the end pieces are illustrated. The guide tubes 20 are enlarged at their upper end into passages of bottom wall 22 formed with indentations and their lower portions are slidably received in the lower end piece 18. On the other hand, guide tubes 24 are crimped at their upper end in plate 24, slidably received in bottom wall 22, and fixed at their lower end, for example by screws, to the lower end piece 18.

The screws may comprise a thin skirt for deformation into a cavity of end piece 18 for preventing them from rotating. The sliding fit of the guide tubes in the end pieces ensures mutual guidance of the two subassemblies and participates in the mechanical strength of the assembly.

Referring to FIG. 4 (where the elements corresponding to those of FIG. 1 are designated by the same reference number) a modified embodiment includes an upper end piece designed so that the springs 30 are disposed between two plates. For that, the end piece 16 consists of a bottom wall 22, having passages (not shown) for coolant flow, extended upwardly by a frame with gripping flanges 32 and downwardly by a skirt 40 having an abutment flange 42. The upper part of each guide tube 24 slides within the bottom wall 22 whereas the upper end of each guide tube 20 is securely connected to the bottom wall.

A plate 28 with coolant flow apertures is slidably mounted in skirt 40. The guide tubes 24 are fixed to plate 28, but the exterior of each guide tube 24 which slides in bottom wall 22 is beyond the connection zone 26. The guide tubes 20 have a sliding fit in plate 28. Springs 30 are disposed concentrically to the end parts of the guide tubes 24 and bias the two substructures into the abutment position as shown in FIG. 4. When the upwardly flowing coolant exerts on the substructures an upwardly directed force, the major part of this force is absorbed, as in FIG. 1, by direct contact of the end piece 16 with the upper core plate 38, whereas spring 30 exerts on plate 28 a sufficient force for maintaining the lower end piece 18 in contact with the core support plate 36.

Figure 5:
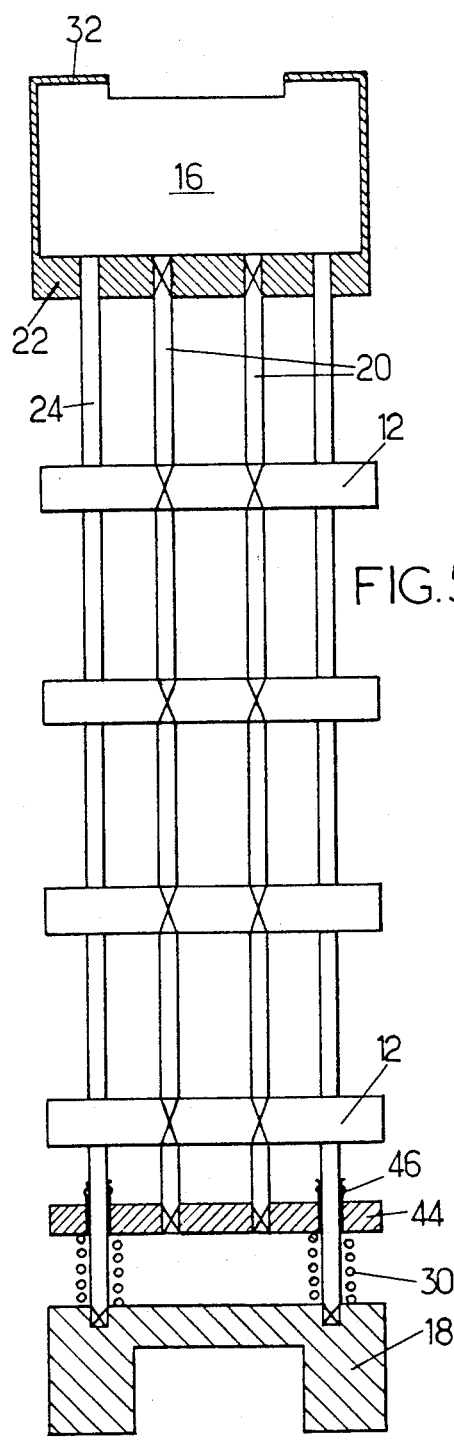

In the modified embodiment shown in FIG. 5, where the elements already described again have the same reference numbers, springs 30 which tend to spread the end pieces apart are disposed in the lower part of the assembly. The first substructure includes the grids 12, the guide tubes 20 fixed to the bottom wall 22 of the upper end piece 16 and an apertured plate or grid 44 slidably mounted on the guide tubes 24. The second substructure includes the guide tubes 24 fixed to the lower end piece 18 and slidable in the upper end piece 16.

Stop means may be provided for limiting the extent of movement of parts 16 and 18 away from each other under the action of springs 30 and/or during handling of the fuel assemblies suspended by the upper end piece 16. As shown in FIG. 5, the stop means are formed by enlarged sockets 46 permanently fixed to the guide tubes 24 and arranged for contact with plate 44.

Springs 30 are disposed about the portion of the guide tubes 24 situated between plate 44 and the lower end piece 18.

The embodiment which has just been described has the advantage that the upper end piece 16 has no spring, which facilitates movement of the control rod clusters used for controlling the core reactivity and facilitates handling of the assembly.

Figure 6:
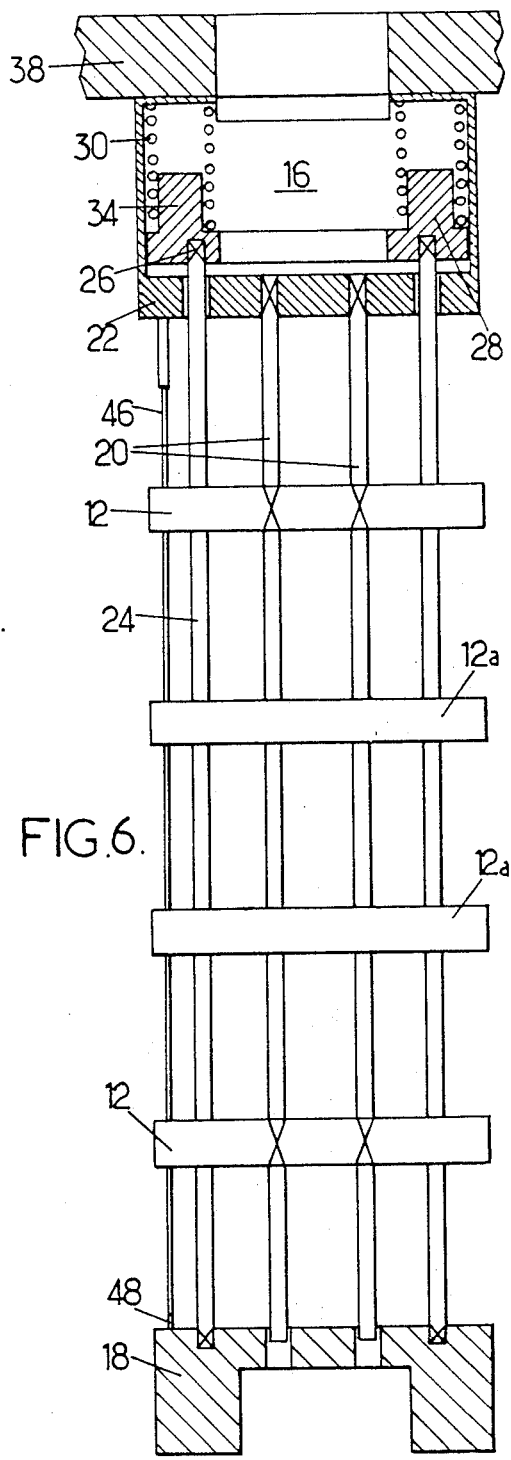

Finally, the assembly shown schematically in FIG. 6 is of the floating grid type, in which some of the grids are not connected to the guide tubes of the first substructure.

Referring to FIG. 6, the assembly has a general construction similar to that shown in FIG. 1. But some of the grids 12a are slidably mounted on the fuel rods 20 and 24. Some of the fuel rods, such as those shown at 46 are provided with resilient means additional to the springs 30 and increasing the force biasing the end pieces 16 and 18 away from each other. The number of such rods 46 will depend on the additional force to be exerted.

Each of the fuel rods 46 has a lower end plug 48 bearing on the lower end piece 18. At its upper end, each such rod carries resilient means which will now be described (the arrangement being reversed if required).

Figure 8:
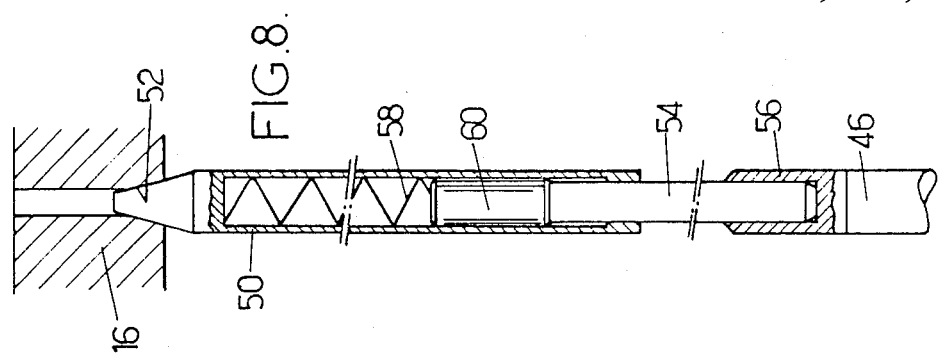
FIGS. 7 and 8 are detail views showing the mounting of a fuel rod in the assembly of FIG. 6 having a particular construction.
Figure 7:
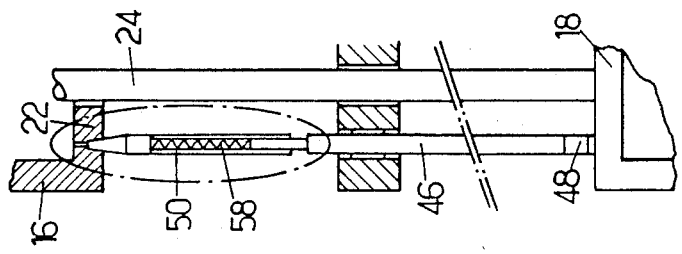

Referring to FIG. 8 which is a view of the part of the fuel rod shown in a dash dot line in FIG. 7 at an enlarged scale, such resilient means include a tubular push rod 50 whose frusto-conical end part engages in a hole 52 in the bottom wall of the upper end piece 16. Push rod 50 is slidably received on a bolt 54 carried by end plug 56 of rod 46. A helical spring 58 is disposed within the push rod 50 between the end part of the push rod and a spacer 60 retained by an internal shoulder of push rod 50. The spacer 60 prevents loss of the spring 58 before the push rod is mounted on the bolt 54. Each spring 58 transmits from one end piece to the other a force participating in the hold down function and completing the action of the springs 30. Each spring 58 may for example exert a precompression force of 1 decanewton. If each fuel rod of a typical fuel assembly, whose rods are distributed at the 17×17 nodes of a square lattice is provided with such resilient means, the total force may reach about 250 daN, i.e. about 25% of the force exerted by a conventional hold down device. Such a contribution allows transmission of part of the hydraulic forces due not only to the bundle of fuel rods, but also to the floating grids 12a.

The arrangement which has just been described is applicable not only to "floating grid" assemblies, but also to assemblies in which all grids are fixed to guide tubes.

We claim:

1. For use in a nuclear reactor core cooled by an upwardly directed coolant flow and defined by a lower core plate and an upper core plate, a nuclear fuel assembly comprising:

a bundle of elongated fuel rods distributed at nodes of a regular lattice, a structure for retaining said fuel rods, having a lower end piece, an upper end piece, a plurality of tie rods extending between said end pieces, and grids distributed along said tie rods for maintaining said fuel rods at said nodes, said structure consisting of two substructures slidable with respect to each other in the direction of said fuel rods, a first one of said substructures including the upper end piece arranged for direct abutment against said upper core plate and some of said rods which are secured to said upper end piece and the other of said substructures including the lower end piece arranged for direct abutment against said lower core plate and the other of said tie rods which are secured to said lower end piece, spring means for spreading apart said two substructures, whereby said lower end piece is retained in abutment against said lower core-plate and means for limiting the amount of spreading of said two structures to a predetermined value.

2. Fuel assembly according to claim 1 wherein the first substructure further comprises some at least of said grids and said fuel rods, while the other substructure consists of the other tie-rods and said lower end piece which are securely connected to each other.

3. Fuel assembly according to claim 1, wherein some at least of the fuel rods each have a first end portion in abutment against the one of said end pieces while their other end portion slidably receives a push rod which is biased against the other end piece by additional resilient means.

4. Fuel assembly according to claim 1, wherein said spring means have a precompression force of from 100 to 200 decanewton.

5. For use in a nuclear reactor cooled by an upwardly directed coolant flow and defined by a lower core plate and an upper core plate, a nuclear fuel assembly comprising:

a bundle of elongated fuel rods distributed at nodes of a regular lattice, a structure for retaining said fuel rods, having a lower end piece, an upper end piece, a plurality of mutually parallel tie rods connecting said end pieces, and grids distributed along said tie rods for maintaining said fuel rods at said nodes, said structure consisting of two substructures slidable with respect to each other in the direction of said fuel rods, wherein one of said substructures comprises the upper end piece arranged for direct abutment against the upper core plate, and some of said tie rods which are secured to said upper end piece and slidably received in said lower end piece, whereas the other of said substructures comprises the lower end piece and the other of said tie rods, said other of said tie rods being secured to said lower end piece, one of said substructures including a member slidably received with respect to the end piece of the other of said substructures and located in close proximity to said other substructure, and spring means compressed between said slidably received member and said end piece of said other substructure for exerting a force tending to spread apart said end pieces.

6. Fuel assembly according to claim 5 wherein said spring means are retained under compression between a bottom wall of the upper end piece and said slidable member which consists of a plate and is located under said upper end piece and said spring means comprise a plurality of springs each located about an extension of one of the tie rods of said second substructure, abutment means being provided for limiting the amount of spreading movement of said higher end piece and said slidable member.

7. For use in a nuclear reactor core cooled by an upwardly directed coolant flow and defined by a lower core plate and an upper core plate, a nuclear fuel assembly comprising:

a bundle of elongated fuel rods distributed at nodes of a regular lattice a structure for retaining said fuel rods, including two substructures slidable with respect to each other in the direction of said fuel rods, a first one of said substructures including an upper end piece arranged for direct abutment against said upper core plate and first guide tubes parallel to said direction and secured to said upper end piece and the other of said substructures including a lower end piece arranged for direct abutment against said lower core plate and second guide tubes parallel to said direction, secured to said lower end piece and carrying a plurality of grids distributed along said tie rods for maintaining said fuel rods at said nodes, said first and second guide tubes being slidably received in the lower end piece and upper end piece respectively, and spring means for spreading apart said two substructures, whereby said lower end piece is retained in abutment against said lower core plate.

8. For use in a nuclear reactor core cooled by an upwardly directed coolant flow and defined by a lower core plate and an upper core plate, a nuclear fuel assembly comprising:

a bundle of elongated fuel rods distributed at nodes of a regular lattice, a structure for retaining said fuel rods, having a lower end piece, an upper end piece, tie rods connecting said end pieces, and grids distributed along said tie rods for maintaining said fuel rods at said nodes, said structure consisting of two substructures slidable with respect to each other in the direction of said fuel rods, wherein one of said substructures comprises the upper end piece arranged for direct abutment against the upper core plate, and some of said tie rods, whereas the other of said substructures comprises the lower end piece and the other of said tie rods, one of said substructures including a member slidably received with respect to the end piece of the other of said substructures and located in close proximity to said other substructure, and spring means compressed between said slidably received member and said end piece of said other substructure for exerting a force tending to spread apart said end pieces, said spring means being retained under compression between an upper flange of said upper end piece and said member which consists of a plate located within said upper end piece and which is mechanically connected to the lower end piece by the tie rods of the other substructure which tie rods project across a bottom wall of the upper end piece.

* * * * *